United States Patent [19]

Myers

[11] Patent Number: 4,704,866
[45] Date of Patent: Nov. 10, 1987

[54] AUTOMATIC TRAVEL SPEED CONTROL FOR A HARVESTING MACHINE

[75] Inventor: H. Allen Myers, Ames, Iowa

[73] Assignee: Sundstrand Corporation, Rockford, Ill.

[21] Appl. No.: 730,667

[22] Filed: May 2, 1985

Related U.S. Application Data

[63] Continuation of Ser. No. 617,569, Jun. 4, 1984, abandoned.

[51] Int. Cl.$^4$ ............................................. F16H 39/46
[52] U.S. Cl. ..................................... 60/449; 180/306; 180/307
[58] Field of Search .......................... 60/449, 447, 443; 417/218; 91/504, 497; 180/306, 307, 305

[56] References Cited

U.S. PATENT DOCUMENTS

| | | |
|---|---|---|
| 3,901,031 | 8/1975 | Knapp et al. |
| 3,924,410 | 12/1975 | Cornell et al. |
| 4,355,509 | 10/1982 | Fulkerson et al. ................... 180/307 |
| 4,448,021 | 5/1984 | Hawkins . |
| 4,455,770 | 6/1984 | Presley .............................. 60/449 X |
| 4,523,892 | 6/1985 | Mitchell et al. ................... 60/449 X |
| 4,542,802 | 9/1985 | Garvey et al. ..................... 60/449 X |

OTHER PUBLICATIONS

Harvstmor brochure by Woodward Governor Company, Harvstmor Control for Self-Propelled Harvesters (no date) (6 pages).
SAE Technical Paper Series, No. 830582, Diesel Engine Load Control with a Hydrostatic Transmission (Feb. 28–Mar. 4, 1983) (12 pages).
The Honeywell instruction manual for the Forward Speed Control W883A, (Rev. 2/77) (9 pages).
The Honeywell interoffice correspondence, Slow Recovery Circuit on Engine Load Control System, Tom Fulkerson (Dec. 17, 1979) (3 pages).

*Primary Examiner*—Edward K. Look
*Attorney, Agent, or Firm*—Wood, Dalton, Phillips, Mason & Rowe

[57] ABSTRACT

The present invention relates to a travel speed control for a hydrostatically propelled harvesting machine or the like, and more particularly to a control system which automatically slows the travel speed of the harvesting machine at a fast rate in response to lugging of the engine and subsequently allows recovery of the travel speed to be at a fast rate initially, followed by a slow recovery rate to insure stability of the control system while minimizing the time required for travel speed recovery.

10 Claims, 10 Drawing Figures

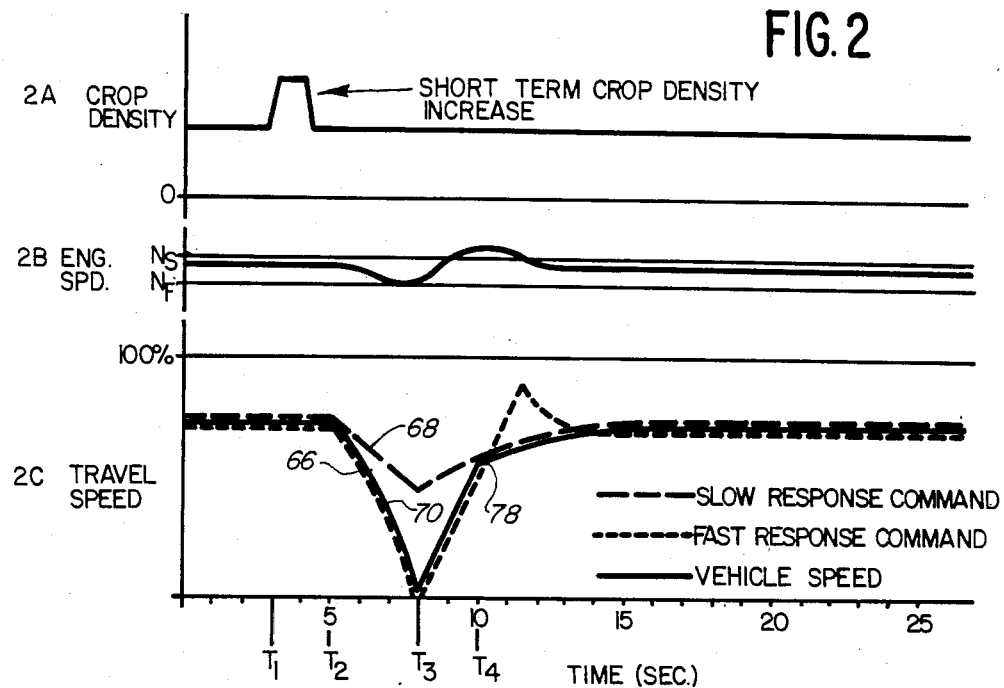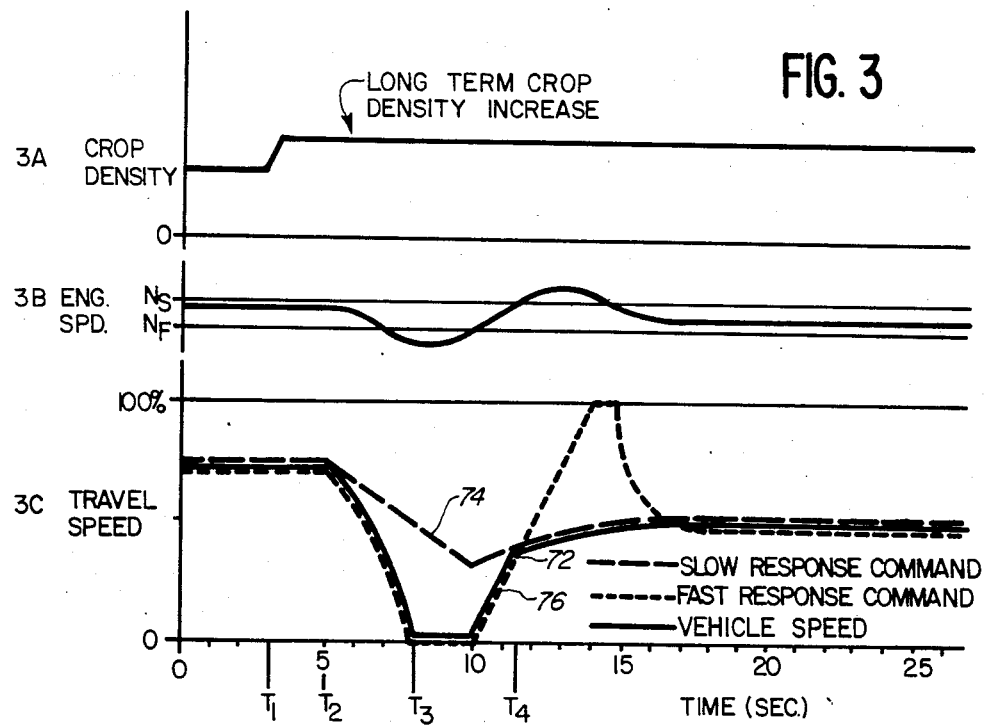

4,704,866

AUTOMATIC TRAVEL SPEED CONTROL FOR A HARVESTING MACHINE

This is a continuation of application Ser. No. 617,569, filed June 4, 1984, now abandoned.

TECHNICAL FIELD

The present invention relates to a travel speed control for a hydrostatically propelled harvesting machine or the like, and more particularly to a control system which automatically slows the travel speed of the harvesting machine at a fast rate in response to lugging of the engine and subsequently allows recovery of the travel speed to be at a fast rate initially, followed by a slow recovery rate to insure stability of the control system while minimizing the time required for travel speed recovery.

BACKGROUND OF THE INVENTION

Hydrostatically propelled harvesting machines and the like, where a significant time delay exists between a change in the travel speed and the effect of the change in speed on engine loading or machine function, typically require speed controls. Known speed controls for harvesting machines have been employed to reduce the travel speed of the machine at a fast rate when the engine begins to lug, which may be caused by the machine encountering a sudden increase in crop density or toughness. However, because of the delay between a change in speed and the effect thereof on machine loading, regenerative instability in the system may occur with such speed controls if the travel speed of the machine is allowed to recover at the same fast rate. For example, in the case of a combine harvester, there is a significant delay between the time the header picks up crop material and the time at which the crop material reaches the thresher, which is the primary source of engine load variation. If the travel speed of the combine is allowed to recover or increase at a fast rate after the travel speed has been reduced, because of the crop transport delay between the header and thresher, the travel speed may increase above a desired equilibrium speed causing the header to pick up an excessive amount of crop material before the engine is loaded sufficiently by the thresher to limit the travel speed. When the excessive crop flow reaches the thresher, the engine will lug, resulting in a slowdown of the combine and repetition of the cycle.

In order to prevent such regenerative instability, speed controls for harvesting machines have been known which slow the travel speed of the harvester at a fast rate in response to lugging of the engine and subsequently allow the travel speed to recover at a slow rate to prevent regenerative instability or surging of the speed. The recovery time for such known speed controls may be on the order of 10-20 seconds after the travel speed has been slowed due to engine lugging. The slow recovery rate is not only annoying for the operator of the machine, but also reduces harvesting productivity.

DISCLOSURE OF THE INVENTION

In accordance with the present invention, the disadvantages of prior travel speed controls for harvesting machines as discussed above have been overcome.

The travel speed control of the present invention automatically slows the travel speed of the harvester at a fast rate in response to lugging of the engine and subsequently allows recovery of the travel speed to be at a fast rate initially, followed by a slow recovery rate to insure stability of the control system while minimizing the time required for travel speed recovery.

The present invention controls the travel speed of a hydrostatically propelled harvesting machine having an engine which drives a pump to supply fluid under pressure to a motor and which includes a displacement control for altering the flow of fluid to the motor in response to a control signal. The speed control senses the speed of the engine and, in response to changes therein, provides two command signals, one of which varies at a fast rate, while the other command signal varies at a slow rate. Means are provided for selecting portions of the two command signals to provide a control signal which causes the travel speed of the harvester to decrease at a fast rate in response to lugging of the engine and to increase at a fast rate initially during recovery, followed by a slower recovery rate when approaching the desired travel speed to insure stability of the system.

In one embodiment of the present invention, both of the command signals vary proportionately with the engine speed and the means for selecting the command signals selects the command signal having the lowest amplitude at a given time to form the control signal at that time. In this embodiment an electrical displacement control alters the flow of fluid to the motor in direct response to the control signal. In a second embodiment, both of the command signals vary inversely with the engine speed and the means for selecting the command signals selects the command signal having the highest amplitude at a given time to form the control signal at that time. The control signal generated by this embodiment is used by a means for overriding a manual input to a mechanical displacement control which alters the flow of fluid to the motor.

These and other objects and advantages of the invention, as well as details of an illustrative embodiment, will be more fully understood from the following description and from the drawings.

BRIEF DESCRIPTION OF THE DRAWINGS

FIGS. 2A-2C are graphs respectively illustrating crop density, engine speed and travel speed as a function of time for a harvesting machine encountering short-term crop density increase;

FIGS. 3A-3C are graphs respectively illustrating crop density, engine speed and travel speed as a function of time for a harvesting machine encountering a long-term crop density increase;

BEST MODE FOR CARRYING OUT THE INVENTION

Figure 1:
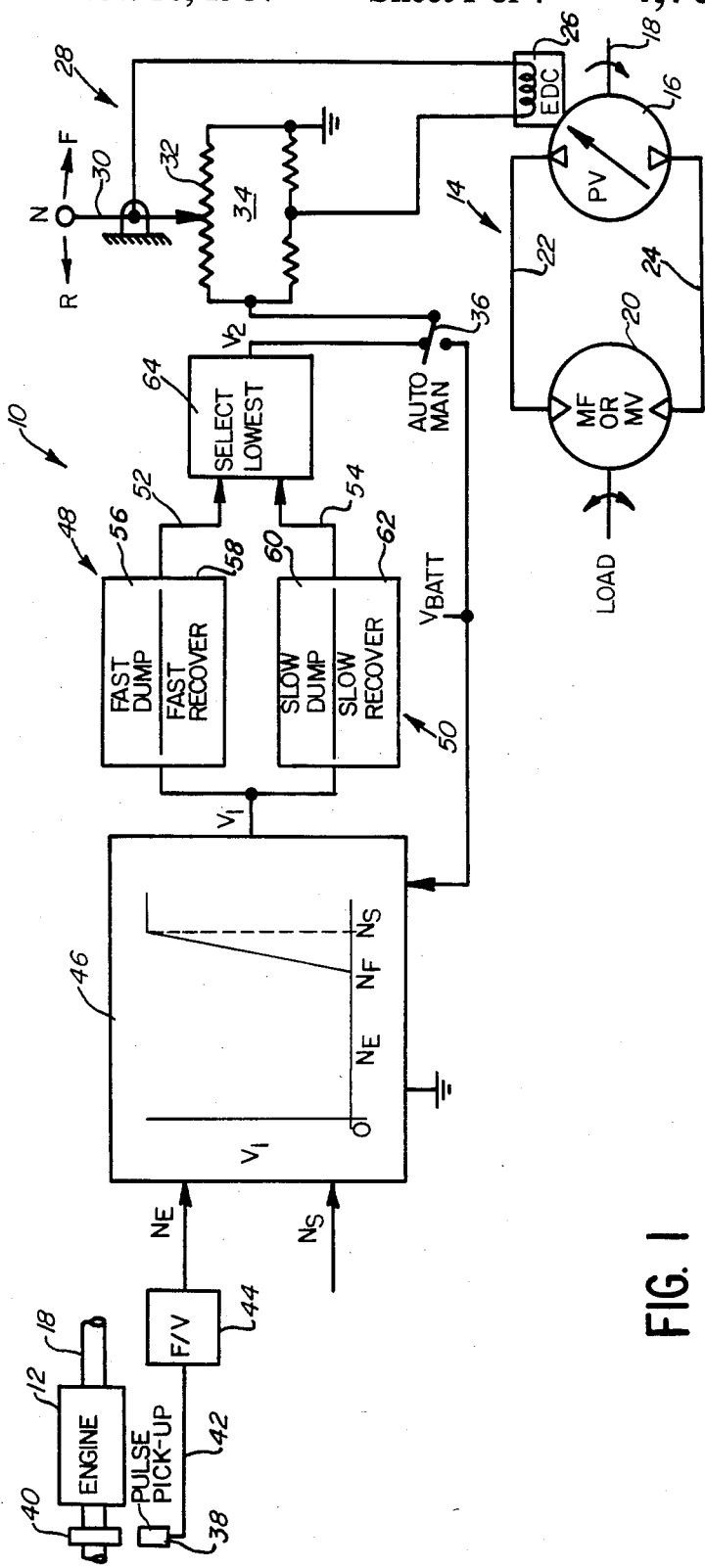
FIG. 1 is a block diagram of a system having the automatic travel speed control of the present invention.

As shown in FIG. 1, an automatic travel speed control, generally designated 10, is used in a system, such as a harvesting machine, having an engine 12 which is the prime mover for a hydrostatic transmission 14 including a variable displacement pump 16 connected to the engine by a drive shaft 18. The pump 16 is in communication with a motor 20, which may be fixed or variable, through conduits 22 and 24 to supply fluid under pressure to the motor 20 which drives a work stage creating a load. The amount of fluid supplied by the pump 16 to the motor 20 and thus the speed of the motor is controlled by an electrical displacement control unit 26 which varies the displacement of the pump by an amount proportional to a voltage supplied by an operator control unit 28.

The operator control unit 28 includes a manually operated control handle 30 which is connected to a potentiometer 32 forming part of a resistor bridge 34. When the control handle 28 is in the center or neutral position as shown, the voltage applied to the displacement control unit 26 is zero, commanding zero travel speed. The voltage applied to the unit 26 is proportionally increased in either a forward or reverse direction by movement of the control handle 30 from the center position to increase the travel speed. A mode selector switch 36 is provided to allow operation of the system in either an automatic or manual mode. In the manual mode, the switch 36 is connected to the full battery voltage, $V_{BATT}$. In the automatic mode as shown, the switch 36 connects the operator control unit 28 to a control voltage $V_2$ which is output from the automatic travel speed control 10. The automatic speed control 10 overrides the manual input provided by the control handle 30 to reduce the travel speed of the system when the engine begins to lug so as to limit engine lugging, grain loss, etc.

The automatic speed control 10 includes a pulse pick-up device 38, or the like, to sense the speed of the engine 12. The pick-up device 38 is responsive to a gear 40 mounted for rotation on a shaft driven by the engine to provide a signal on line 42, the frequency of which is proportional to the speed of the engine 12. The input signal on line 42, representing the actual engine speed, is monitored by the travel speed control 10 which quickly responds to drops therein to decrease the control voltage $V_2$ by a proportional amount. The decreased voltage $V_2$, input to the operator control unit 28 through the selector switch 36, proportionately decreases the setting of the electrical displacement control unit 26 to reduce the pump displacement and thus the flow of fluid to the motor 20 at a fast rate so that the hydrostatic transmission 14 imposes less load on the engine 12. When the load is decreased, reducing the load torque on the engine 12 so that the engine speed rises, the travel speed control 10 responds by increasing the control voltage $V_2$ by a proportional amount, initially at a fast rate, and then at a slower rate to insure stability of the system while minimizing the time required for travel speed recovery.

In order to generate the control voltage $V_2$, the input signal from the pick-up device 38 is applied to a frequency to voltage converter 44, the output of which is a voltage $N_E$ which is proportional to the actual running speed of the engine 12. The engine speed voltage, $N_E$, is applied to a proportional gain stage 46 where it is compared to a control set point or reference voltage, $N_S$, which represents the engine speed at which the automatic control 10 will begin reducing the travel speed of the system below the value set by the manual control handle 30. The output of the proportional gain stage 46 is a voltage, $V_1$, having a maximum amplitude when the engine speed voltage $N_E$ is equal to or greater than the control set point voltage $N_S$. As the engine speed is lugged below the control set point, the voltage $V_1$ is proportionally reduced until it reaches zero at an engine speed of $N_F$.

The output voltage $V_1$ of the proportional gain stage 46 is applied to a pair of rate limiting circuits 48 and 50. The rate limiting circuit 48 is responsive to a change in the voltage $V_1$ for providing a fast responsive command signal on a line 52 having an amplitude which is proportional to the voltage $V_1$ and which varies at a fast rate. The rate limiting circuit 50 is responsive to a change in the amplitude of the voltage $V_1$ for providing a slow response command signal on a line 54 having an amplitude which is proportional to the voltage $V_1$ but which varies at a rate which is slower than the rate of the signal output on line 52. More particularly, the rate limiting circuit 48 includes a fast dump circuit 56 which is responsive to a decrease in the voltage $V_1$ to decrease the command signal on line 52 at a fast rate, the circuit 48 also including a fast recovery circuit 58 which is responsive to an increase in the voltage $V_1$ to increase the voltage on line 52 at a fast rate. The rate limiting circuit 50 includes a slow dump circuit 60 which is responsive to a decrease in the voltage $V_1$ to provide an output on line 54 which decreases at a slow rate, the circuit 50 also including a slow recovery circuit 62 which is responsive to an increase in the voltage $V_1$ to provide an output on line 54 which increases at a slow rate.

The fast response command signal output on line 52 from the circuit 48 and the slow response command signal output on line 54 from the rate limiting circuit 50 are both applied to a selection circuit 64 which selects portions of the fast response and slow response command signals to form the control voltage $V_2$ output from the automatic travel speed control 10. The selection circuit 64 selects whichever command signal has the lowest amplitude to provide a control voltage which decreases at a fast rate in response to a decrease in the engine speed and which increases, initially at a fast rate, in response to an increase in the engine speed, until the command signals on lines 52 and 54 are equal at which time the control voltage increases at the slower rate to insure stability of the system.

FIGS. 2A–2C illustrate the operation of the automatic travel speed control 10 for a harvesting machine which encounters a short-term crop density increase as shown in FIG. 2A. As shown in FIG. 2B, the system is at equilibrium operating with an engine speed less than the control set point, $N_S$, and greater than the speed $N_F$ until time $T_2$. The harvesting machine also has a constant travel speed, as shown in FIG. 2C, until time $T_2$ when the thresher of the harvesting machine encounters the increased crop density, the time between $T_1$ and $T_2$ being the time required for the increased crop density to travel from the header to the thresher of the machine. At time $T_2$, the engine begins to lug, the engine speed falling to $N_F$ at which time the output voltage $V_1$ from the proportional gain stage 46 is equal to zero. The fast rate limiting circuit 48 responds to the drop in engine speed by producing a fast response command 66 which drops to zero at time $T_3$. The slow rate limiting circuit 50 in response to the drop in engine speed provides a slow response command signal 68. During the time period from $T_2$ to $T_3$, the selection circuit 64 selects the lowest amplitude command signal to form the control voltage $V_2$ which, as seen from FIG. 2C, provides a travel speed 70 corresponding to the fast command signal. Upon an increase in the engine speed at time $T_3$, the rate limiting circuits 48 and 50 provide increasing command signals which are applied to the selection circuit 64. During the time period $T_3$ to $T_4$, the selection circuit 64 again selects the fast response command to form the control voltage so that the travel speed of the system increases initially at a fast rate. At time $T_4$, the fast response comm and 66 increases above the slow response command 68 so that the selection circuit 64 selects the slow response command to form the control voltage $V_2$. Because the travel speed 70 is allowed to recover initially at a fast rate, the time required for the travel speed recovery is minimized while the change to the slower recovery rate at the point 78 at which the two command signals are equal insures stability of the system.

Although the selection circuit 64 never actually selects the slow dump command signal to form a portion of the control voltage, the slow dump command signal determines the point at which the recovery rate will change from a fast rate to a slow rate and thus is very important to the operation of the present invention. As seen in FIG. 3, when the harvesting machine encounters a long-term crop density change, the crop density is still high after the machine has been stopped and the engine speed and thus the travel speed do not begin to increase until the machine has been stopped for approximately 2 seconds. This is opposed to the situation depicted in FIG. 2 where the crop density has returned to normal before the machine is stopped at time $T_3$ allowing the travel speed to increase immediately. In FIG. 3, because the travel speed of the harvesting machine is stopped for a longer period of time than that depicted in FIG. 2, the intersection point 72 of the slow response command 74 and the fast response command 76 is at a much lower value than the intersection point 78 and further, the travel speed on recovery is limited to a lower value in FIG. 3 than the value shown in FIG. 2. In FIG. 3, the continuing high crop density after the machine has stopped at time $T_3$ indicates a reasonable probability that the crop density will remain high for some time after the machine motion resumes. Further, the continuing high crop density also causes more severe engine loading than a short-term crop density increase. The slow dump command signal allows the automatic control 10 to react to such situations in a different manner than the manner in which the control reacts to a short-term crop density increase. More specifically, when a long-term crop density increase is encountered which causes more severe engine loading and a longer period of vehicle slowdown, the control 10, because of the slow dump command signal, provides a control voltage which limits the vehicle speed to a lower value on recovery.

Figure 4:
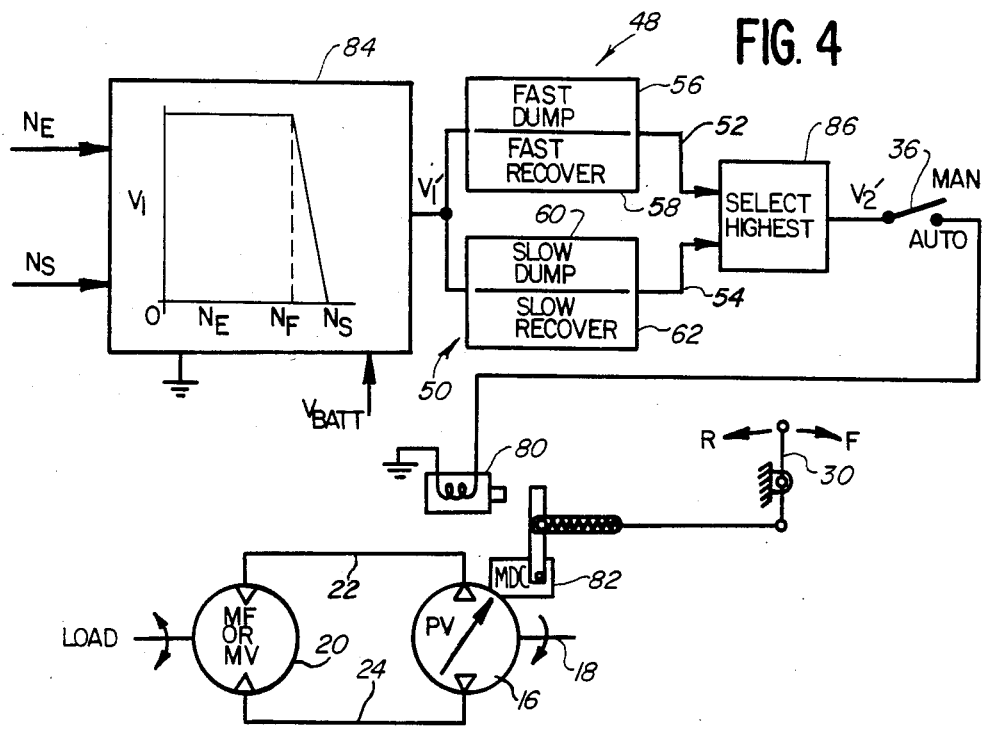
FIG. 4 is a block diagram illustrating a second embodiment of the travel speed control of the present invention.

FIG. 4 illustrates a second embodiment of the present invention which may be used for a system in which an override actuator 80 is responsive to a control voltage to override a mechanical input from the control handle 30 to a mechanical displacement control unit 82 for the pump 16. A proportional gain stage 84 is provided having the reverse characteristics of the gain stage 46 shown in FIG. 1. More specifically, in response to the engine speed voltage, $N_E$, and the control set point voltage, $N_S$, the proportional gain stage provides an output voltage $V_1'$ which is zero when the engine speed voltage is equal to or greater than the control set point voltage, the output voltage $V_1'$ increasing to a maximum value when the engine speed is lugged below the set point speed until it reaches a maximum value when the engine speed voltage $N_E$ equals the speed voltage $N_F$. The voltage, $V_1'$, output from the proportional gain stage 84, is applied to the fast rate limiting circuit 48 and the slow rate limiting circuit 50 as described with reference to FIG. 1. The fast response command signal on line 52 and the slow response command signal on line 54 are applied to a selection circuit 86 which selects the highest command signal to form the control voltage $V_2'$. In the automatic mode, the control voltage $V_2'$ is applied to the override actuator 80 which in response thereto overrides the input to the manual displacement control 82 at a fast rate in response to a decrease in the engine speed, to decrease the flow of fluid to the motor 20 at a fast rate bringing the travel speed of the vehicle to zero. As the engine speed increases, the override actuator 80 responds to the control voltage $V_2'$ to initially allow the input to the manual displacement control 82 to increase at a fast rate until the fast response command signal equals the slow response command signal at which time the override actuator 80 operates at a slower rate.

Figure 5:
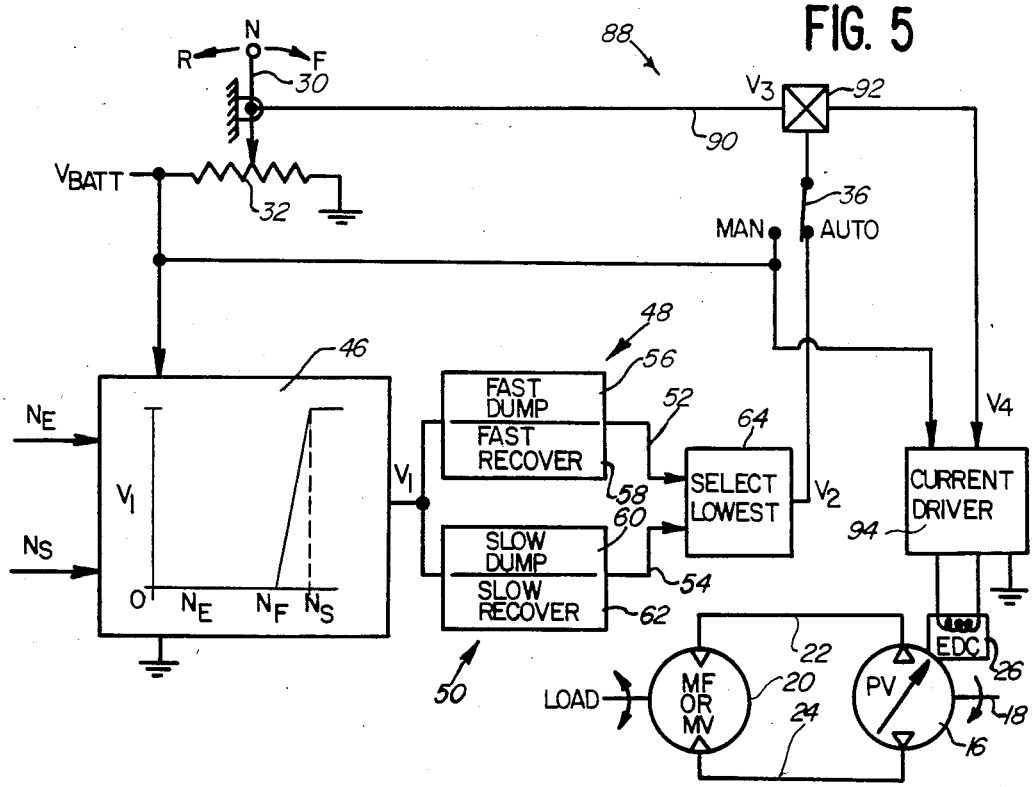
FIG. 5 is a block diagram of the travel speed control of FIG. 1 for use with a modified system.

FIG. 5 illustrates a system in which the control handle 30 provides an input to an electrical control system 88 which controls the displacement unit 26, as opposed to controlling the displacement unit 26 directly, as shown in FIG. 1. More specifically, the manual control handle provides a voltage $V_3$ on a line 90 to a multiplier 92 which multiplies the voltage $V_3$ by the control voltage $V_2$ output from the automatic travel speed control 10 which is identical to that shown in FIG. 1. The output voltage $V_4$ of the multiplier 92 is applied to a current driver 94 which controls the current flowing through the electrical displacement control unit 26 proportionally to the voltage $V_4$. The operation of the system shown in FIG. 5 is identical to the system shown in FIG. 1. The significant difference is that in the system of FIG. 5 the control of the displacement control unit 26 is done through an electronic control system 88 which may be a microprocessor based control.

Figure 6:
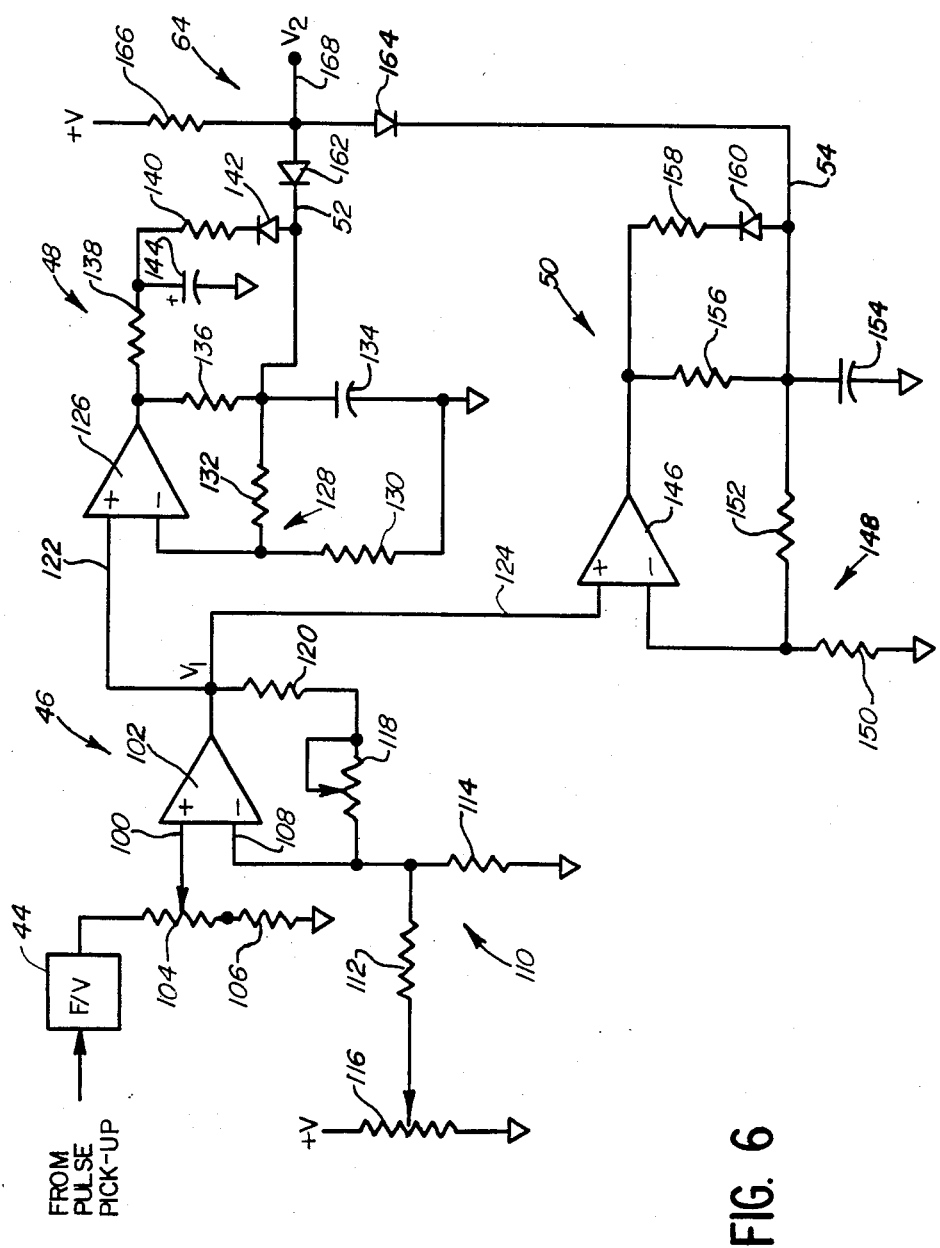
FIG. 6 is a schematic diagram illustrating the travel speed control of FIG. 1.

The automatic travel speed control 10, as shown in greater detail in FIG. 6, receives an input signal from a pulse pick-up device or the like having a frequency which is proportional to the engine speed, the output of the pulse pick-up device being applied to the frequency to voltage converter 44. The output of the frequency to voltage converter 44 is a voltage proportional to the frequency of the input signal and thus proportional to the speed of the engine 12. The speed voltage output from the converter 44 is applied to a noninverting input terminal 100 of an op amp 102, forming the proportional gain stage 46, through a 5 KΩ set point adjustment potentiometer 104 which is connected to ground through a 1.3 KΩ resistor 106. The op amp 102 compares the engine speed voltage, applied to the input terminal 100 to the control set point voltage applied to an inverting input terminal 108 from a voltage divider 110 comprised of a 3 MΩ resistor 112 and a 30 KΩ resistor 114, the voltage divider 110 being connected to a set point potentiometer 116. When the engine speed voltage is equal to or greater than the control set point voltage, the output of the op amp 102 provides a constant maximum value. When the engine speed voltage drops below the set point voltage, the output of the op amp 102 drops by a proportional amount as determined by the setting of a sensitivity potentiometer 118 connected to the output of the op amp 102 through a 620 KΩ resistor 120.

The output of the proportional gain stage 46 is applied to the fast rate limiting circuit 48 on a line 122 and is applied to the slow rate limiting circuit 50 on a line 124. The fast rate limiting circuit 48 includes an op amp 126 having a noninverting input terminal connected to the output of the op amp 102. The inverting input terminal of the op amp 126 is connected to a voltage divider generally designated 128 comprised of a 360 KΩ resistor 130 and a 510 KΩ resistor 132. The output of the op amp 126 is connected to a 15μf capacitor 134 through a 470 KΩ resistor 136 connected in parallel with a series combination of a 10 KΩ resistor 138, a 100 KΩ resistor 140 and a diode 142 with a 10 μf capacitor 144 being connected between the resistors 138 and 140 to ground. The RC time constant, determined by the values of the resistors 138 and 140 and the capacitor 134, determines the rate at which the command voltage output on line 52 from the rate limiting circuit 48, decreases upon a decrease in the engine speed voltage. The RC time constant determined by the values of the resistor 136 and the capacitor 134 determines the rate at which the control voltage $V_O$ increases upon a subsequent increase in the engine speed voltage.

The slow rate limiting circuit 50 includes an op amp 146 having a noninverting input terminal connected to the output of the op amp 102. The inverting input terminal of the op amp 146 is connected to a voltage divider 148 comprised of a 750 KΩ resistor 150 and a 1 MΩ resistor 152. The output of the op amp 146 is connected to a 22 μf capacitor 154 through a 1.5 MΩ resistor 156 which is connected in parallel with a series combination of a 1.5 MΩ resistor 158 and a diode 160. The RC time constant determined by the values of the resistor 158 and the capacitor 154 determines the rate at which the command signal output on line 54 from the slow rate limiting circuit 50 decreases upon a decrease in the engine speed voltage, the RC time constant determined by the values of the resistor 156 and the capacitor 154 determining the rate at which the command voltage on line 54 increases upon a subsequent increase in the engine speed voltage.

The selection circuit 64 includes a pair of diodes 162 and 164 having respective cathodes connected to line 52, the output of the fast rate limiting circuit 48, and to line 54, the output of the slow rate limiting circuit 50. The anodes of the diodes 162 and 164 are connected to +V volts through a 15 MΩ resistor to pass the lowest signal on line 168 to form the control voltage $V_2$.

Although the automatic travel speed control 10 is shown as an analog control in FIG. 6, the control 10 may also be microprocessor based as discussed with reference to FIG. 5.

I claim:

1. An engine driven motor controlled system utilizing a control signal for controlling the speed of the motor, a speed control for providing said control signal comprising:
   means for sensing a change in the engine speed;
   means responsive to a change in the engine speed as sensed by said sensing means for providing a first command signal having an amplitude which varies at a fast rate;
   means responsive to a change in the engine speed as sensed by said sensing means for providing a second command signal having an amplitude which varies at a slow rate; and
   means for selecting portions of the first and second command signals to form a control signal which causes the speed of the motor to decrease at a fast rate in response to a decrease in the engine speed and in response to a subsequent increase in the engine speed, the control signal causing the speed of the motor to increase at a fast rate until the first command signal equals the second command signal at which time said control signal causes the speed of the motor to increase at a slow rate.

2. In a system having an engine which drives a pump to supply fluid under pressure to a motor and including means responsive to a control signal for altering the flow of fluid to the motor, a speed control comprising:
   means for sensing a change in the engine speed;
   means for providing a first command, the magnitude of which varies rapidly in response to a change in said engine speed as sensed by said sensing means, the magnitude of said first command decreasing rapidly in response to a decrease in said engine speed and increasing rapidly in response to a subsequent increase in said engine speed;
   means for providing a second command, the magnitude of which varies slowly in response to a change in said engine speed as sensed by said sensing means, the magnitude of said second command decreasing slowly in response to a decrease in said engine speed and increasing slowly in response to a subsequent increase in said engine speed; and
   means for selecting the command having the lowest magnitude at a given time to form said control signal at that time.

3. The system of claim 2 wherein the rapidly varying command decreases and increases at a first rate and the slowly varying command decreases and increases at a second rate which is less than the first rate.

4. In a system having an engine which drives a pump to supply fluid under pressure to a motor and including a displacement control for altering the flow of fluid to the motor and means responsive to a control signal for overriding said displacement control, a speed control comprising:
   means for sensing a change in the engine speed;
   means for providing a first command, the magnitude of which varies rapidly in response to a change in said engine speed as sensed by said sensing means, the magnitude of said first command increasing rapidly in response to a decrease in said engine speed and decreasing rapidly in response to a subsequent increase in said engine speed;
   means for providing a second command, the magnitude of which varies slowly in response to a change in said engine speed as sensed by said sensing means, the magnitude of said second command increasing slowly in response to a decrease in said engine speed and decreasing slowly in response to a subsequent increase in said engine speed; and
   means for selecting the command having the highest magnitude to form said control signal.

5. The system of claim 4 wherein the rapidly varying command increases and decreases at a first rate and the slowly varying command increases and decreases at a second rate which is less than the first rate.

6. In a system having an engine which drives a pump to supply fluid under pressure to a motor and including means response to a control signal for altering the flow of fluid to the motor, a speed control comprising:
   means for sensing the speed of said engine to provide a signal representative thereof;

means for comparing said speed signal to a reference signal to provide an output signal having a maximum amplitude when said speed signal is equal to the reference signal and having a decreased amplitude proportional to said speed signal when said speed signal is less than said reference signal;

means responsive to a change in the amplitude of the output signal from said comparing means for providing a fast response command signal having an amplitude which is proportional to said output signal and which varies at a first rate;

means responsive to a change in the amplitude of the output signal from said comparing means for providing a slow response command signal having an amplitude which is proportional to said output signal and which varies at a second rate which is less than said first rate; and means for selecting the response command signal having the lowest amplitude to form said control signal.

7. The system of claim 6 further including a control handle for providing a signal proportional to a desired motor speed, said means for altering the flow of fluid to the motor including means for multiplying the control signal from the selecting means by the control handle signal; and means for varying the flow of fluid to the motor in accordance with the output from said multiplying means.

8. In a system having an engine which drives a pump to supply fluid under pressure to a motor and including a displacement control for altering the flow of fluid to the motor and means responsive to a control signal for overriding said displacement control, a speed control comprising:

means for sensing the speed of said engine to provide a signal representative thereof;

means for comparing said speed signal to a reference signal to provide an output signal having a minimum amplitude when said speed signal is equal to the reference signal, the amplitude of the output signal being proportional to said speed signal and increasing to a maximum value when said speed signal is less than said reference signal;

means responsive to a change in the amplitude of the output signal from said comparing means for providing a fast response command signal having an amplitude which is proportional to said output signal and which varies at a first rate;

means responsive to a change in the amplitude of the output signal from said comparing means for providing a slow response command signal having an amplitude which is proportional to said output signal and which varies at a second rate which is less than said first rate; and means for selecting the response command signal having the highest amplitude to form said control signal.

9. An engine driven motor controlled system utilizing a control signal for controlling the speed of the motor, a speed control for providing said control signal comprising:

means for sensing the speed of the engine;

means responsive to a decrease in said engine speed for providing a first command signal, the amplitude of which decreases at a first rate;

means responsive to an increase in said engine speed for providing a second command signal, the amplitude of which increases at a second rate;

means responsive to an increase in said engine speed for providing a third command signal, the amplitude of which increases at a third rate which is less than said first and second rates;

means for forming said control signal from selected portions of said command signals, said forming means selecting said first command signal to form a portion of said signal in response to a decrease in said engine speed, said forming means, in response to a subsequent increase in said engine speed, selecting the second command signal initially to form a portion of said control signal and selecting the third command signal to form the next portion of said control signal when the amplitude of the second command signal rises above the amplitude of the third command signal; and means responsive to a decrease in the engine speed for varying the amplitude of the third command signal to vary the time at which the forming means selects the third command signal to form a portion of the control signal.

10. The system of claim 9 therein said amplitude varying means includes means responsive to a decrease in the engine speed to provide a fourth command signal, the amplitude of which decreases at a fourth rate to a value from which the third command signal increases upon an increase in the engine speed, said fourth rate being less than said first and second rates.

* * * * *